(12) United States Patent
Dhurandhar et al.

(10) Patent No.: US 12,670,439 B2
(45) Date of Patent: Jun. 30, 2026

(54) GENERATING LOCALLY INVARIANT EXPLANATIONS FOR MACHINE LEARNING

(71) Applicants: International Business Machines Corporation, Armonk, NY (US); Université de Montréal, Montréal (CA)

(72) Inventors: Amit Dhurandhar, Yorktown Heights, NY (US); Karthikeyan Natesan Ramamurthy, Pleasantville, NY (US); Kartik Ahuja, Montreal (CA); Vijay Arya, Gurgaon (IN)

(73) Assignees: International Business Machines Corporation, Armonk, NY (US); Université de Montréal, Montreal (CA)

( * ) Notice: Subject to any disclaimer, the term of this patent is extended or adjusted under 35 U.S.C. 154(b) by 836 days.

(21) Appl. No.: 18/048,341

(22) Filed: Oct. 20, 2022

(65) Prior Publication Data

US 2024/0135239 A1 Apr. 25, 2024
US 2024/0232687 A9 Jul. 11, 2024

(51) Int. Cl.
G06N 20/00 (2019.01)

(52) U.S. Cl.
CPC ................................... G06N 20/00 (2019.01)

(58) Field of Classification Search
CPC ................................ G06N 20/00; G06N 5/04
See application file for complete search history.

(56) References Cited

U.S. PATENT DOCUMENTS

| | | | |
|---|---|---|---|
| 2017/0277855 A1* | 9/2017 | De La Torre | G16Z 99/00 |
| 2018/0188301 A1* | 7/2018 | McBrearty | G01R 22/10 |
| 2020/0356891 A1 | 11/2020 | Saito | |
| 2021/0012897 A1 | 1/2021 | Katuwal et al. | |
| 2021/0241115 A1 | 8/2021 | Ibrahim et al. | |
| 2023/0025712 A1* | 1/2023 | Qin | G06F 18/217 |
| 2023/0143235 A1* | 5/2023 | Dong | A61B 5/7275 |
| | | | 702/19 |

(Continued)

OTHER PUBLICATIONS

Hansen, Jakob Vogdrup. "Combining predictors: comparison of five meta machine learning methods." Information Sciences 119.1-2 (1999): 91-105 (Year: 1999).*

(Continued)

*Primary Examiner* — Andrew T McIntosh
(74) *Attorney, Agent, or Firm* — CANTOR COLBURN LLP; Steven Bouknight

(57) ABSTRACT

Techniques for generating explanations for machine learning (ML) are disclosed. These techniques include identifying an ML model, an output from the ML model, and a plurality of constraints, and generating a plurality of neighborhoods relating to the ML model based on the plurality of constraints. The techniques further include generating a predictor for each of the plurality of neighborhoods using the ML model and the plurality of constraints, constructing a combined predictor based on combining each of the respective predictors for the plurality of neighborhoods, and creating one or more explanations relating to the ML model and the output from the ML model using the combined predictor.

14 Claims, 7 Drawing Sheets

(56) References Cited

U.S. PATENT DOCUMENTS

2023/0309133 A1* 9/2023 Rafael ..................... G06N 20/00
2023/0410488 A1* 12/2023 Hamamoto ............ G06V 10/80

OTHER PUBLICATIONS

Golshanrad, Paria, et al. "MEGA: Predicting the best classifier combination using meta-learning and a genetic algorithm." Intelligent Data Analysis 25.6 (2021): 1547-1563 (Year: 2021).*
Xu, et al. "Explainable AI: A Brief Survey on History, Research Areas, Approaches and Challenges"—Scientific Figure on ResearchGate. https://www.researchgate.net/figure/Two-categories-of-Explainable-AI-work-transparency-design-and-post-hoc-explanation_fig4_336131051.
V. Arya et al., "One Explanation Does Not Fit All: A Toolkit and Taxonomy of AI Explainability Techniques," [Submitted on Sep. 6, 2019 (v1), last revised Sep. 14, 2019 (this version, v2)], <https://arxiv.org/abs/1909.03012>.
X. Zhao et al., "BayLIME: Bayesian Local Interpretable Model-Agnostic Explanations," [Submitted on Dec. 5, 2020 (v1) last revised May 29, 2021 (this version, v5)], https://arxiv.org/abs/2012.03058.
K. Ahuja et al., "Invariant risk minimization games," Proc. 37th International Conference on Machine Learning, Online, PMLR 119, pp. 145-155, Nov. 2020.
K. Ramamurthy et al., "Analogies and Feature Attributions for Model Agnostic Explanation of Similarity Learners," [Submitted on Feb. 2, 2022], <https://arxiv.org/abs/2202.01153>.
K. Ramamurthy et al., "Model Agnostic Multilevel Explanations," 34th Conference on Neural Information Processing Systems (NeurIPS 2020), Vancouver, 33, pp. 5968-5979, 2020. <https://proceedings.neurips.cc/paper/2020/hash/426f990b332ef8193a61cc90516c1245-Abstract.html>.
Grace Period Disclosure: Locally Invariant Explanations: Towards Stable and Unidirectional Explanations through Local Invariant Learning, Amit Dhurandhar, Karthikeyen Ramamurthy, Karthik Ahuja, Vijay Arya, Jan. 28, 2022.
Martin Arjovsky et al., "Invariant Risk Minimization," arXiv:1907.02893v3, dated Mar. 27, 2020, pp. 1-31.
"Medical Expenditure Panel Survey (MEPS)", Agency for Healthcare Research and Quality, Aug. 8, 2019, 2 pages, doi: https://meps.ahrq.gov/mepsweb/.
A. A. Shrotri et al., "Constraint-Driven Explanations for Black-Box ML Models", Proceedings of the AAAI Conference on Artificial Intelligence, Jun. 2022, 11 pages, vol. 36, doi: 10.1609/aaai.v36i8.20805.
A. Dhurandhar et al., "Enhancing Simple Models by Exploiting What They Already Know", Proceedings of the 37th International Conference on Machine Learning, 2020, 10 pages, vol. 119.
A. Dhurandhar et al., "Explanations based on the Missing: Towards Contrastive Explanations with Pertinent Negatives", Advances in Neural Information Processing Systems, Feb. 2018, 22 pages, DOI: 10.48550/arXiv.1802.07623.
A. Dhurandhar et al., "Improving Simple Models with Confidence Profiles", arXiv, Jul. 19, 2018, 17 pages, doi: https://doi.org/10.48550/arXiv.1807.07506.
A. Ghorbani et al., "Interpretation of neural networks is fragile", arXiv, Oct. 29, 2019, 21 pages, doi: https://doi.org/10.48550/arXiv.1710.10547.
A. H. Karimi et al., "Algorithmic Recourse: from Counterfactual Explanations to Interventions", arXiv, Feb. 14, 2020, 10 pages, doi: https://doi.org/10.48550/arXiv.2002.06278.
A. Kumar et al., "Variational Inference of Disentangled Latent Concepts from Unlabeled Observations", arXiv, Nov. 2, 2017, 16 pages, doi: https://doi.org/10.48550/arXiv.1711.00848.
B. Kim et al., "Examples are not enough, learn to criticize! Criticism for Interpretability", Part of Advances in Neural Information Processing Systems 29 (NIPS 2016), 2016, 9 pages.

B. Pang et al., "Thumbs up? Sentiment Classification Using Machine Learning Techniques", arXiv, Jun. 2002, 9 pages, doi: 10.3115/1118693.1118704.
Bareinboim et al., "Local Characterizations of Causal Bayesian Networks", in Croitoru, M., Rudolph, S., Wilson, N., Howse, J., Corby, O. (eds) Graph Structures for Knowledge Representation and Reasoning. Lecture Notes in Computer Science, Springer, 2012, 6 pages, vol. 7205, doi: https://doi.org/10.1007/978-3-642-29449-5_1.
C. Aggarwal et al., "Data Clustering Algorithms and Applications", CRC Press, Aug. 2013, 20 pages.
C. Frye et al., "Asymmetric shapley values: incorporating causal knowledge into model-agnostic explainability", arXiv, NeurIPS, Oct. 14, 2019, 14 pages, doi: https://doi.org/10.48550/arXiv.1910.06358.
C. J. Anders et al., "Fairwashing explanations with off-manifold detergent", Proceedings of the 37th International Conference on Machine Learning, Jul. 2020, 10 pages, vol. 119.
C. K. Yeh et al., "On the (In)fidelity and Sensitivity for Explanations", Advances in Neural Information Processing Systems, Jan. 27, 2019, 25 pages, doi: https://doi.org/10.48550/arXiv.1901.09392.
C. Molnar "Interpretable machine learning", 2019, 251 pages, doi: https://originalstatic.aminer.cn/misc/pdf/Molnar-interpretable-machine-learning_compressed.pdf.
C. Rudin et al., "Stop Explaining Black Box Machine Learning Models for High Stakes Decisions and Use Interpretable Models Instead", arXiv, Nov. 26, 2018, 20 pages, doi: https://doi.org/10.48550/arXiv.1811.10154.
D. Dheeru et al., "UCI Machine Learning Repository", Jul. 13, 2017, 2 pages, doi: https://archive.ics.uci.edu/ml.
D. Gunning et al., "Explainable artificial intelligence (xai)", Darpa/120, Nov. 2017, 36 pages.
E. Creager et al., "Environment Inference for Invariant Learning", Proceedings of the 38th International Conference on Machine Learning, 2021, 8 pages, vol. 139.
G. Debreu, "A Social Equilibrium Existence Theorem", Proceedings of the National Academy of Sciences of the United States of America, 1952, pp. 886-893, vol. 38, https://doi.org/10.1073/pnas.38.10.886.
G. Hinton et al., "Distilling the Knowledge in a Neural Network", arXiv, Mar. 9, 2015, 9 pages, doi: https://doi.org/10.48550/arXiv.1503.02531.
G. Plump et al., "Model Agnostic Supervised Local Explanations", arXiv, Jul. 9, 2018, 10 pages, doi: https://doi.org/10.48550/arXiv.1807.02910.
H. Lakkaraju et al., "Robust and Stable Black Box Explanations", arXiv, Nov. 12, 2020, 14 pages, doi: https://doi.org/10.48550/arXiv.2011.06169.
H. Xiao et al., "Fashion-MNIST: a Novel Image Dataset for Benchmarking Machine Learning Algorithms", arXiv, Aug. 25, 2017, 6 pages, doi: https://doi.org/10.48550/arXiv.1708.07747.
H. Zhang et al., "The Limitations of Adversarial Training and the Blind-Spot Attack", arXiv, Jan. 15, 2019, 16 pages, doi: https://doi.org/10.48550/arXiv.1901.04684.
Judea Pearl et al., "Casuality", Cambridge University Press, 2009, 487 pages, doi: https://doi.org/10.1017/CBO9780511803161.
K. Ahuja et al., "Linear Regression Games: Convergence Guarantees to Approximate Out-of-Distribution Solutions", arXiv, Oct. 28, 2020, 38 pages, doi: https://doi.org/10.48550/arXiv.2010.15234.
K. Gurumoorthy et al., "Efficient Data Representation by Selecting Prototypes with Importance Weights", ArXiv, Jul. 5, 2017, 10 pages, doi: https://doi.org/10.48550/arXiv.1707.01212.
K. Simonyan et al., "Deep Inside Convolutional Networks: Visualising Image Classification Models and Saliency Maps", arXiv, Dec. 20, 2013, 8 pages, doi: https://doi.org/10.48550/arXiv.1312.6034.
L. Hancox-Li, "Robustness in machine learning explanations: does it matter?", In Proceedings of the 2020 Conference on Fairness, Accountability, and Transparency. ACM, Jan. 2020, 8 pages, doi: http://dx.doi.org/10.1145/3351095.3372836.
M. Sundararajan et al., "Axiomatic Attribution for Deep Networks", Proceedings of the 34th International Conference on Machine Learning, Mar. 2017, 10 pages, vol. 70, doi: https://doi.org/10.48550/arXiv.1703.01365.

(56) References Cited

OTHER PUBLICATIONS

M. T. Ribeiro et al., "Why Should I Trust You?': Explaining the Predictions of Any Classifier", arXiv, Feb. 16, 2016, 10 pages, doi: https://doi.org/10.48550/arXiv.1602.04938.

P. K. Dutta "Strategies and Games: Theory and Practice", MIT Press, 1999, 384 pages, doi: https://arteref.com/wp-content/uploads/2019/12/Prajit-K.-Dutta-Strategies-and-Games_-Theory-and-Practice-The-MIT-Press-1999.pdf.

P. N. Yannella et al., "Analysis: Article 29 Working Party Guidelines on Automated Decision Making Under GDPR", Posted in Article 29 Working Party, Compliance, Cross-Border Data Flow, Data Protection, EU Regulation, General Data Protection Regulation (GDPR), Legislation, Jan. 16, 2018, 4 pages.

S. Feng et al., "Pathologies of Neural Models Make Interpretations Difficult", Proceedings of the 2018 Conference on Empirical Methods in Natural Language Processing, Oct. 2018, pp. 3719-3728, doi: https://arxiv.org/abs/1804.07781v3.

S. Lapuschkin et al., "The LRP Toolbox for Artificial Neural Networks", Journal of Machine Learning Research, 2016, 5 pages, vol. 17, No. 114.

S. M. Lundberg et al., "A Unified Approach to Interpreting Model Predictions", Advances in Neural Information Processing Systems, Dec. 2017, 10 pages, doi: 10.48550/arXiv.1705.07874.

T. Botari et al., "MeLIME: Meaningful Local Explanation for Machine Learning Models", arXiv, Sep. 12, 2020, 21 pages, doi: https://doi.org/10.48550/arXiv.2009.05818.

T. Heskes et al., "Causal Shapley Values: Exploiting Causal Knowledge to Explain Individual Predictions of Complex Models", Advances in Neural Information Processing Systems, Nov. 3, 2020, 21 pages, doi: https://doi.org/10.48550/arXiv.2011.01625.

Tim Miller, "Explanation in artificial intelligence: Insights from the social sciences", Artificial Intelligence, Feb. 2019, pp. 1-38, vol. 267, doi: https://doi.org/10.1016/j.artint.2018.07.007.

Y. Roth et al., "Updating our approach to misleading information", X Blog, May 11, 2020, 3 pages, doi: https://blog. twitter.com/en_us/topics/product/2020/updating-our-approach-to-misleading-information.html.

* cited by examiner

600

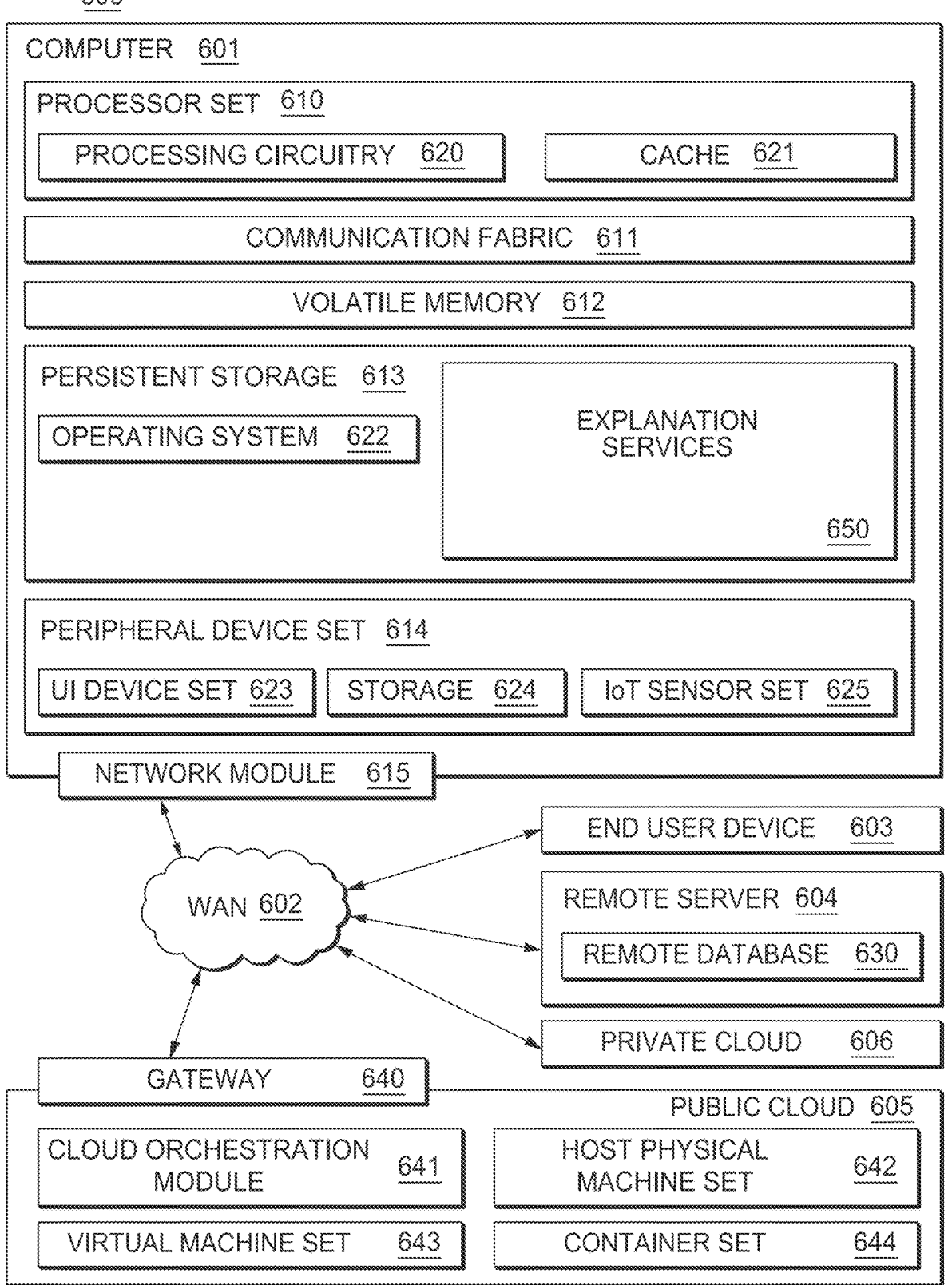

COMPUTER   601

PROCESSOR SET   610

PROCESSING CIRCUITRY   620          CACHE   621

COMMUNICATION FABRIC   611

VOLATILE MEMORY   612

PERSISTENT STORAGE   613

OPERATING SYSTEM   622

EXPLANATION SERVICES

650

PERIPHERAL DEVICE SET   614

UI DEVICE SET   623     STORAGE   624     IoT SENSOR SET   625

NETWORK MODULE   615

WAN 602

END USER DEVICE   603

REMOTE SERVER  604

REMOTE DATABASE   630

PRIVATE CLOUD   606

GATEWAY   640

PUBLIC CLOUD  605

CLOUD ORCHESTRATION MODULE   641

HOST PHYSICAL MACHINE SET   642

VIRTUAL MACHINE SET   643

CONTAINER SET   644

FIG. 6

GENERATING LOCALLY INVARIANT EXPLANATIONS FOR MACHINE LEARNING

COLOR DRAWINGS

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURE: Locally Invariant Explanations: Towards Stable and Unidirectional Explanations through Local Invariant Learning, Amit Dhurandhar, Karthikeyen Ramamurthy, Karthik Ahuja, Vijay Arya, Jan. 28, 2022.

BACKGROUND

The present invention relates to machine learning (ML), and more specifically, to generating explanations for ML.

SUMMARY

Embodiments include a method. The method includes identifying a machine learning (ML) model, an output from the ML model, and a plurality of constraints. The method further includes generating a plurality of neighborhoods relating to the ML model, based on the plurality of constraints. The method further includes generating a predictor for each of the plurality of neighborhoods using the ML model and the plurality of constraints. The method further includes constructing a combined predictor based on combining each of the respective predictors for the plurality of neighborhoods. The method further includes creating one or more explanations relating to the ML model and the output from the ML model using the combined predictor.

Embodiments further include a system, including: a processor and a memory having instructions stored thereon which, when executed on the processor, performs operations. The operations include identifying a machine learning (ML) model, an output from the ML model, and a plurality of constraints. The operations further include generating a plurality of neighborhoods relating to the ML model, based on the plurality of constraints. The operations further include generating a predictor for each of the plurality of neighborhoods using the ML model and the plurality of constraints. The operations further include constructing a combined predictor based on combining each of the respective predictors for the plurality of neighborhoods. The operations further include creating one or more explanations relating to the ML model and the output from the ML model using the combined predictor.

Embodiments further include a computer program product including: a computer-readable storage medium having computer-readable program code embodied therewith, the computer-readable program code executable by one or more computer processors to perform operations. The operations include identifying a machine learning (ML) model, an output from the ML model, and a plurality of constraints. The operations further include generating a plurality of neighborhoods relating to the ML model, based on the plurality of constraints. The operations further include generating a predictor for each of the plurality of neighborhoods using the ML model and the plurality of constraints. The operations further include constructing a combined predictor based on combining each of the respective predictors for the plurality of neighborhoods. The operations further include creating one or more explanations relating to the ML model and the output from the ML model using the combined predictor.

BRIEF DESCRIPTION OF THE DRAWINGS

FIG. 6 further illustrates a computing environment, according to one embodiment.

DETAILED DESCRIPTION

Figure 1:
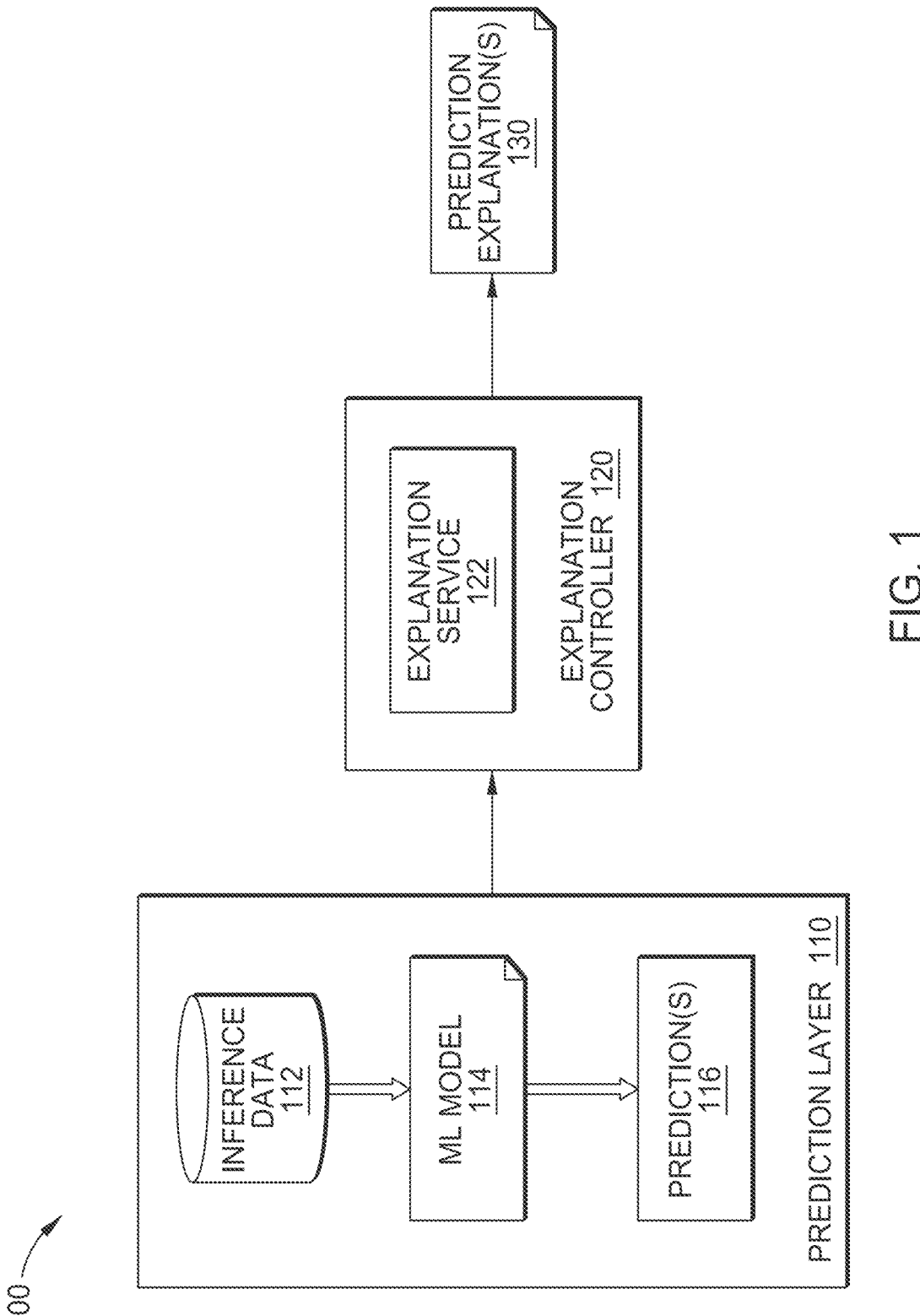
FIG. 1 illustrates a computing environment for generating locally invariant explanations for ML, according to one embodiment.

Deployment and usage of black-box ML models (e.g., neural networks) has grown significantly over recent years. This has created a need for new tools to help users understand, and trust, these ML models. For example, even relatively well-studied application domains such as image recognition require some form of prediction understanding in order for the user to incorporate the model into important decisions. An example of this could be a doctor who is given a predicted medical diagnosis based on analysis of an image scan by an ML model. Since the doctor holds responsibility for the diagnosis, it is very valuable for the doctor to receive an explanation for the ML model's prediction. This is merely one example, and explanations for ML model inference are useful across a wide variety of ML models and applications.

While research has been done on local post-hoc explanations for neural networks, local explanations typically are quite vulnerable to randomizations and sampling when creating neighborhoods. For example, one existing technique for explanation of ML models is called locally interpretable model-agnostic explanations (LIME). LIME can, in some circumstances, provide local explanations for ML model inference based on query (or black-box) access to the ML model. LIME, however, has significant drawbacks. For example, it is known to be sensitive to certain design choices. These design choices include sampling (e.g., random sampling) to create neighborhoods (e.g., perturbation neighborhoods) generated for local explanations. Design choices that can affect LIME further include neighborhood size (e.g., number of samples) and local fitting procedures used to learn the explanation.

In an embodiment, these drawbacks for LIME can lead to nearby examples having drastically different explanations, making effective recourse very challenging. One possible recourse would be to increase the neighborhood size (e.g., increase perturbation neighborhood size). But this can lead to higher computational burden. Other possible recourses include creating realistic neighborhoods or using adversarial training, but the efficacy of each of these possible recourses is restricted to certain settings and modalities based on their respective assumptions and training strategies.

One or more techniques describe herein solve one or more of the drawbacks of LIME and other prior solutions, using improved techniques based on improvements to the principle of invariant risk minimization (IRM). For example, as discussed further below with regard to FIGS. 3-4, these techniques can extend IRM principles to resemble a simultaneous game, with multiple neighborhoods and where each neighborhood is treated as a player trying to find the best predictor for its neighborhood given all the other predictors and constraints. This can produce feature based explanations that are robust to neighborhood sampling and can recover faithful explanations (e.g., mimicking black-box ML model behavior), stable explanations (e.g., similar for close by examples), and unidirectional explanations (e.g., providing same sign attributions for close by examples) across numerous modalities for ML models. For example, one or more of these techniques can be applied to tabular, image, and text modalities for ML models. These improved techniques are discussed further in the paper "Locally Invariant Explanations: Towards Stable and Unidirectional Explanations through Local Invariant Learning," by Amit Dhurandhar, Karthikeyen Ramamurthy, Karthik Ahuja, and Vijay Arya. This paper is herein incorporated by reference.

In essence, one or more techniques disclosed herein can be used to create explanations that are stable across all neighborhoods, while LIME and other existing techniques create explanations that are neighborhood-dependent. In particular, one or more of these techniques perform very well for both random and realistic neighborhood generation. Further, one or more of these techniques can be used to provide stable highlights of local ML model features that are important in a particular locality. This success is illustrated further, below with regard to FIGS. 5A-B, for example datasets.

FIG. 1 illustrates a computing environment 100 for generating locally invariant explanations for ML, according to one embodiment. In an embodiment, a prediction layer 110 is used for ML predictions. The prediction layer 110 includes an ML model 114, which uses inference data 112 to generate one or more predictions 116. For example, the ML model 114 can be a supervised ML model that has been trained (e.g., in a training phase using training data) to infer the one or more predictions 116 from the inference data 112. The ML model 114 can be any suitable ML model (e.g., a neural network or any other suitable ML model).

In an embodiment, the ML model 114 is a black box ML model that generates the predictions 116 based on the inference data 112 without providing an explanation for the predictions, or while providing only a limited explanation for the predictions. In an embodiment, an explanation controller 120 includes an explanation service 122. The explanation service 122 generates one or more prediction explanations 130 for the predictions 116 by the ML model 114. This is discussed further, below, with regard to FIGS. 3-5B. For example, the explanation service 122 can analyze the ML model 114 and the inference data 112 to generate one or more locally invariant explanations for the predictions 116.

In an embodiment, as discussed above, the explanation service uses an improved adaption of IRM to generate prediction explanations 130. In an embodiment, IRM provides a learning paradigm that estimates nonlinear, invariant, causal predictors from multiple training environments, to enable out-of-distribution generalization. For example, IRM can operate according to the principle: to learn invariances across environments, find a data representation such that the optimal classifier on top of that representation matches for all environments. That is, a goal of IRM is use a collection of datasets to construct a predictor that performs well across many unseen environments. IRM is explained in more detail in the paper *Invariant Risk Minimization*, by Martin Arjovsky, Léon Bottou, Ishaan Gulrajani, and David Lopez-Paz, arXiv:1907.02893 (2019).

In an embodiment, the explanation service improves on IRM in one or more of several ways. For example, existing IRM techniques typically learn global models directly from a dataset. In an embodiment, the explanation service can provide local explainability by learning local models that, for example, explain a given black-box model (e.g., the ML model 114). As another example, the explanation service can highlight features in the prediction explanations 130 that may be spurious from the domain perspective, but nonetheless the ML model 114 uses them to make decisions. Third, while a typical IRM model does not have to be interpretable as its learned representation can be arbitrary, the explanation service can generate interpretable prediction explanations. Fourth, an IRM learning procedure is often quite inefficient as it tries to solve a bi-level optimization problem with a highly non-convex constraint. The explanation service can be significantly more efficient by using convex constraints, as discussed further below with regard to FIGS. 3-4. Fifth, IRM techniques generally assume that one has access to multiple existing neighborhood environments (e.g., from multiple data sources), but as discussed further below the explanation service creates one or more neighborhoods for each example being explained.

In an embodiment and as discussed further below with regard to FIG. 3, the explanation service uses a technique that resembles a simultaneous game, with multiple neighborhoods and where each neighborhood is treated as a player trying to find the best predictor for its neighborhood given all the other predictors and constraints. In an embodiment, the optimization problem solved by each player is convex as norms are convex.

Further, in an embodiment, the explanation service can use a Nash Equilibrium game theory approach for the simultaneous game. In an embodiment, a Nash Equilibrium identifies a state where each player is using the best possible strategy in response to the rest of the players, leaving no incentive for any player to alter their strategy. For a special class of games, called concave games, a pure Nash Equilibrium has been show to always exist. In an embodiment, as explained further below with regard to FIG. 3, the explanation service can use a concave game approach in which a Nash Equilibrium always exists.

Figure 2:
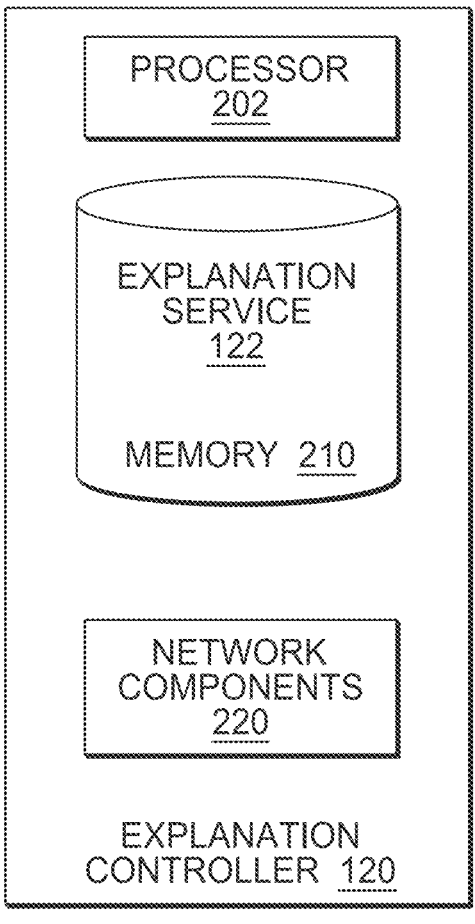
FIG. 2 illustrates a controller for generating locally invariant explanations for ML, according to one embodiment.

FIG. 2 illustrates a controller for generating locally invariant explanations for ML, according to one embodiment. An explanation controller 120 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the explanation controller 120 to interface with a suitable communication network (e.g., a communication network interconnecting various components of the computing environment 100 illustrated in FIG. 1, or interconnecting the computing environment 100 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the explanation controller 120. The program code is generally described as various functional "applications" or "modules" within the memory 210, although alternate implementations may have different functions and/or combinations of functions. Within the memory 210, the explanation service 122 facilitates generating prediction explanations for predictions by an ML model. This is discussed further, below, with regard to FIGS. 3-5B.

While the explanation controller 120 is illustrated as a single entity, in an embodiment, the various components can be implemented using any suitable combination of physical compute systems, cloud compute nodes and storage locations, or any other suitable implementation. For example, the explanation controller 120 could be implemented using a server or cluster of servers. As another example, the explanation controller 120 can be implemented using a combination of compute nodes and storage locations in a suitable cloud environment (e.g., as discussed further below). For example, one or more of the components of the explanation controller 120 can be implemented using a public cloud, a private cloud, a hybrid cloud, or any other suitable implementation.

Although FIG. 2 depicts the explanation service 122 as being located in the memory 210, that representation is also merely provided as an illustration for clarity. More generally, the explanation controller 120 may include one or more computing platforms, such as computer servers for example, which may be co-located, or may form an interactively linked but distributed system, such as a cloud-based system, for instance. As a result, the processor 202, and the memory 210, may correspond to distributed processor and memory resources within the computing environment 100. Thus, it is to be understood that the explanation service 122 may be stored at any suitable location within the distributed memory resources of the computing environment 100.

Figure 3:
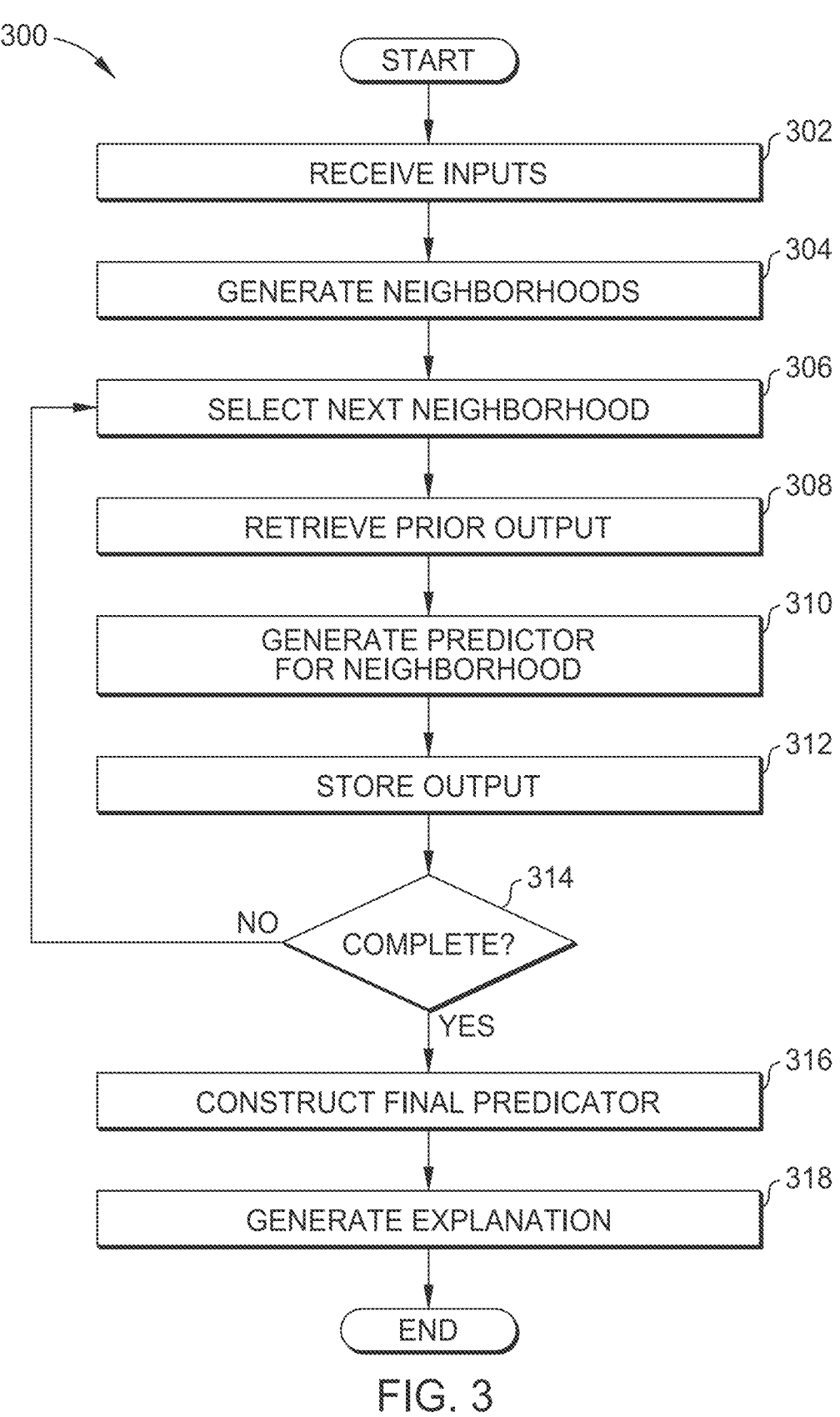
FIG. 3 is a flowchart for generating locally invariant explanations for ML, according to one embodiment.

FIG. 3 is a flowchart 300 for generating locally invariant explanations for ML, according to one embodiment. At block 302, an explanation service (e.g., the explanation service 122 illustrated in FIG. 2) receives inputs. This is discussed further, below, with regard to FIG. 4. For example, the explanation service can receive as input the predictor ML model (e.g., the ML model 114 illustrated in FIG. 1) and an example to be explained x (e.g., the inferred output of the predictor ML model).

The explanation service can further receive as input a number of constraints, including a least absolute shrinkage and selection operator (LASSO) type constraint (e.g., used to keep the final predictor sparse as is also seen in LIME) and an constraint on the predictor of the current neighborhood. As discussed above, in an embodiment using convex constraints allows the explanation service to more efficiently generate explanations.

Further, the explanation service can receive as input a desired number of local neighborhoods k. In an embodiment, the explanation service generates an explanation using a simultaneous game, with multiple neighborhoods and where each neighborhood is treated as a player trying to find the best predictor for its neighborhood given all the other predictors and constraints. The desired number of local neighborhoods can be used as the number of neighborhoods for this game.

At block 304, the explanation service generates neighborhoods. In an embodiment, traditional IRM framework environments treat neighborhoods as a received given. By contrast the explanation service can create neighborhoods. For example, as discussed above, the explanation service can receive as input a number of neighborhoods. The explanation service can then generate neighborhoods using random perturbation, realistic generation or selection, or using any suitable technique.

As a first example, the explanation service can use random perturbation to generate neighborhoods. In an embodiment, the explanation service perturbs the input example to create the base neighborhood, and then performs bootstrap sampling to create the k different neighborhood environments. The explanation service can add zero mean gaussian noise to perturb the input example, or can use any other suitable technique. While using random perturbation can allow the explanation service to efficiently create neighborhoods, these neighborhoods may be unrealistic (e.g., the created neighborhoods could correspond to low probability points with regard to the underlying distribution).

As another example, the explanation service can generate or select realistic neighborhoods. For example, the explanation service can use a suitable data generator, or select neighboring examples from a training data set, to create a base neighborhood environment. The explanation service can then use bootstrap sampling to form the k different neighborhoods. In an embodiment, this approach provides more realistic neighbors than random perturbation, but may be much more computationally expensive. Further, in an embodiment, instead of using bootstrap sampling to generate to create the k different neighborhood environments (e.g., for random perturbation or generation of realistic neighborhoods), the explanation service can over sample and attempt to find an optimal hard/soft partition through clustering.

At block 306, the explanation service selects a next neighborhood. For example, the explanation service selects a next neighborhood from among the neighborhoods generated at block 304.

At block 308, the explanation service retrieves a prior output. For example, as discussed below with regard to block 310, in an embodiment the explanation service fits a predictor (e.g., a constrained least squares predictor) for each neighborhood. For the first predictor, the explanation service performs linear fitting using the constraints received as inputs (e.g., at block 302). That output is stored for later use (e.g., stored at block 312). For subsequent predictors (e.g., for additional neighborhoods), the explanation service performs linear fitting that additionally uses the output from the prior neighborhood. Thus, if a prior output exists, the explanation service retrieves the prior output at block 308.

At block 310, the explanation service generates a predictor for the neighborhood. In an embodiment, for the first neighborhood the explanation service fits a predictor using the input constraints. For example, the explanation service can generate a predictor for the first neighborhood by fitting a least squares predictor to the neighborhood using the input constraints. For subsequent neighborhoods (e.g., after the first neighborhood), the explanation service generates the predictor by fitting the predictor to the residual from the prior neighborhood predictor, subject to the input constraints. This is illustrated further, bellow, with the pseudo-code algorithm discussed after block 318.

At block 312, the explanation service stores the output. For example, the explanation service can store the predictor that was fit at block 310. This predictor can then be used by the explanation service in subsequent passes to fit additional predictors for additional neighborhoods.

At block 314, the explanation service determines whether the explanation is complete. In an embodiment, the explanation service determines whether the predictor weights (e.g., for the predictor fit at block 310) are changing between passes. If the predictor weights stop changing, or slow down sufficiently (e.g., based on a threshold value), then the explanation is sufficiently complete and the flow proceeds to block 316. If not, the flow returns to block 306 and the explanation service selects the next neighborhood.

At block 316, the explanation service constructs a final predictor. In an embodiment, the explanation service constructs a final predictor by summing the individual predictors for the different neighborhoods (e.g., fit at block 310). In embodiment, the explanation service iteratively learns a constrained least squares predictor for each neighborhood (e.g., as discussed above in relation to block 310), where the final (local) linear predictor is the sum of these individual predictors. In each iteration when computing the contribution of neighborhood to the final summed predictor, the most recent contributions of the other predictors are summed and the residual is optimized subject to the constraints.

At block 318, the explanation service generates the explanation. For example, the explanation service can use the final predictor generated at block 318 to generate the explanation. Example explanations are illustrated below with regard to FIGS. 5A-B.

In an embodiment, the techniques illustrated in FIG. 3 can be illustrated mathematically and algorithmically using the pseudocode below, where x represents the result to be explained, the black box predictor is f(·), the number of environments to be created is k, the ($l_∞$) threshold $γ>0$, the ($l_1$) threshold $t>0$ and the convergence threshold $ε>0$:

```
do
    for i = 1 to k do
```
$$\tilde{\omega}_{-i}^{+} = \sum_{j\in\{1,...k\}, j\neq i} \tilde{\omega}_j$$
$$\tilde{\omega}_i^{prev} = \tilde{\omega}_i$$
$$\tilde{\omega}_i = \arg_{\tilde{\omega}_i}\min \sum_{\tilde{x}\in\xi_i(x)}\left(f(\tilde{x}) - \tilde{\omega}_{-i}^{+T}\tilde{x} - \tilde{\omega}^T\tilde{x}\right)^2 \text{ s.t.}$$
$$\left|\tilde{\omega}_{-i}^{+T} + \tilde{\omega}\right|_1 \leq t \text{ and } |\tilde{\omega}|_\infty \leq γ$$
$$\Delta = \max(|\tilde{\omega}_i^{prev} - \tilde{\omega}_i|_2, \Delta)$$
```
    end
while Δ ≤ ε
```
$$\text{output: } \omega = \sum_{i\in\{1,...,k\}}\tilde{\omega}_i$$

In an embodiment, $$\left|\tilde{\omega}_{-i}^{+T} + \tilde{\omega}\right|_1 \leq t \text{ and } |\tilde{\omega}|_\infty \leq γ$$

are convex constraints. Further, $\forall i\in\{1, ..., k\}$, the explanation service initializes $\tilde{\omega}_i=1$ and $\Delta=0$. A unidirectionality value $γ$ is a measure of how consistent the sign of the attribution for a particular feature in a local explanation is when varying neighborhoods for the same example, or when considering different close by examples.

Figure 4:
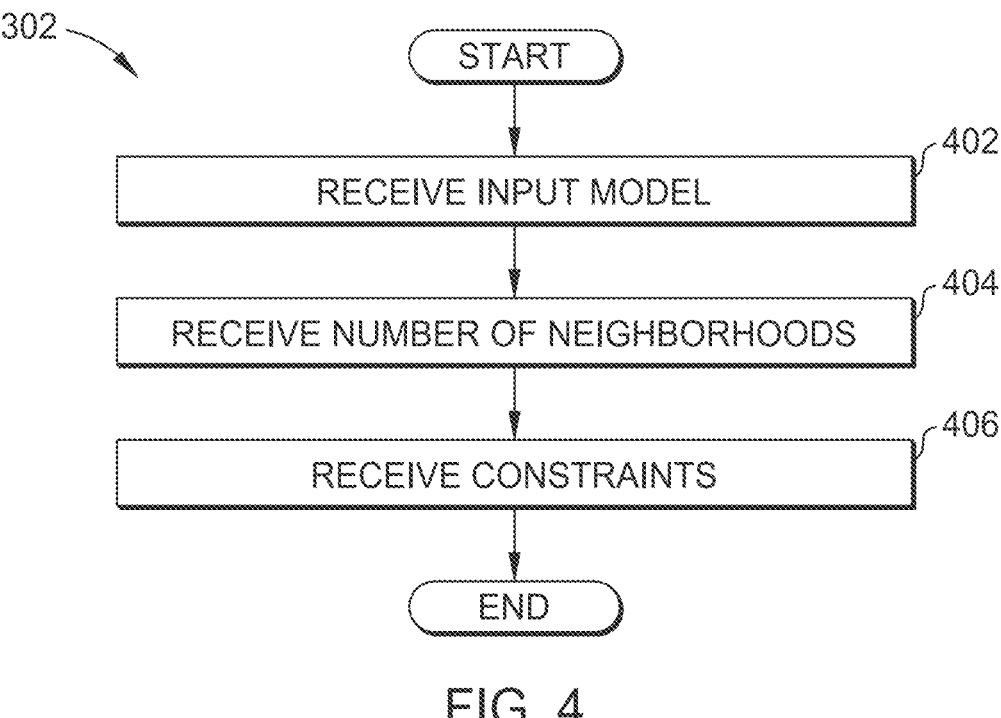
FIG. 4 is a flowchart illustrating receiving inputs for generating locally invariant explanations for ML, according to one embodiment.

FIG. 4 is a flowchart illustrating receiving inputs for generating locally invariant explanations for ML, according to one embodiment. In an embodiment, FIG. 4 corresponds with block 302 illustrated in FIG. 3. At block 402, an explanation service (e.g., the explanation service 122 illustrated in FIGS. 1-2) receives an input model. In an embodiment, this is the ML model to be explained (e.g., a black box ML model). This can be a neural network (e.g., a deep learning neural network (DNN)), or any other suitable ML model.

At block 404, the explanation service receives the number of neighborhoods. As discussed above, in an embodiment the explanation service generates an explanation using a simultaneous game, with multiple neighborhoods and where each neighborhood is treated as a player trying to find the best predictor for its neighborhood given all the other predictors and constraints. The number of neighborhoods received at block 404 can be used as the number of neighborhoods for this game (e.g., the number of neighborhoods generated at block 304 illustrated above in FIG. 3).

At block 406, the explanation service receives constraints. For example, the explanation service can receive two constraints. In an embodiment, the first constraint is a standard LASSO type constraint which tries to keep the final predictor sparse. This is similar to constraints used in LIME.

In an embodiment, the second constraint is an $l_∞$ constraint on the predictor, for the current environment (e.g., the current neighborhood being analyzed). This constraint facilitates obtaining robust predictors. For example, assume that two neighborhoods are used (this is just an example, and any suitable number of neighborhoods can be used). In this case, if the optimal predictors for a feature in each of the two neighborhoods have opposite signs, then the Nash equilibrium is when each predictor (e.g., each iteration of the explanation service) takes $+γ$ or $-γ$ values as they try to force the sum to have the same sign as the counterpart. In other words, features that have a disagreement in even the direction of their impact are eliminated by the use of this constraint.

In an embodiment, this is an improvement over LIME and similar techniques, which instead choose some form of average value of the predictors. This can be a risky choice, especially for actionability and recourse explanations, given that the directions change abruptly. Returning to the two environment example if, on the other hand, the optimal predictors for a feature in the two environments have the same sign, the lower absolute valued predictor would be chosen (assuming $γ$ is greater) making it a careful choice.

Thus, if the signs of the explanations for an unconstrained predictor (e.g., a least squares predictor) for two environments differ for some feature, then the explanation service outputs a zero as the attribution for that feature. If the signs of the explanations for the two environments are the same, then the explanation service outputs the lesser magnitude of the two. These two properties are highly desirable from an algorithmic recourse or actionability perspective, because the former property (e.g., outputting zero for differing signs) biases the explanation service to not rely on features where the black-box function changes direction rapidly (unidirectionality). The latter property (e.g., outputting the lesser magnitude for matching signs) provides a reserved estimate so that the explanation service does not incorrectly over rely on the particular feature (e.g., providing additional stability).

The example discussed above relates to two environments (e.g., two neighborhoods). But this is merely an examples, and similar techniques can be used for more than two environments. For example, if the number of environments is odd, then feature attribution would be equal to the median of the feature attributions across all the environments. Essentially, all environments with optimal least squares attributions above the median would be at $+\gamma$, while those below it would be at $-\gamma$. The one at the median would remain so with no incentive for any environment to alter its attribution, making it a Nash equilibrium. This is a stable choice that is also likely to be faithful as the explanation service has no more information to decide otherwise.

On the other hand, if the explanation service uses an even number of environments the final attribution depends on the middle two environments in the same manner as the two environment example discussed above. Thus, if the optimal least squares attributions of the middle two environments have opposite sign, then the final attribution is zero. Otherwise, the final attribution is the lower of the two attributions in terms of the numerical value. This happens because the Nash equilibrium for the other environments is $\pm\gamma$ depending on whether the optimal least squares attributions are above or below those of the middle two environments. This again is a stable and likely to be faithful choice, where also unidirectionality is preferred.

Figure 5A:
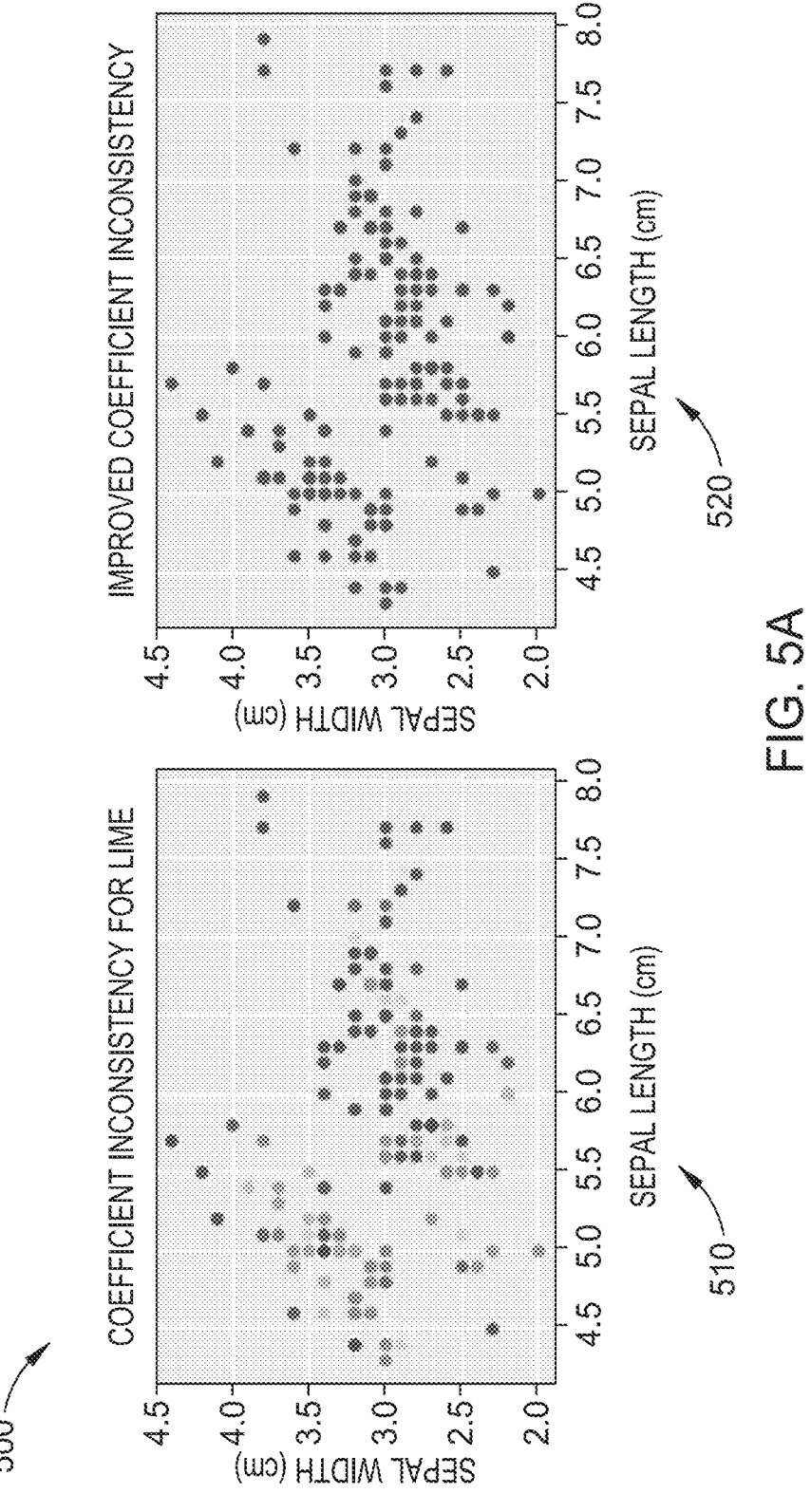
FIG. 5A illustrates effectiveness of generating locally invariant explanations for ML, according to one embodiment.

FIG. 5A illustrates a graph 500 of the effectiveness of generating locally invariant explanations for ML, according to one embodiment. In an embodiment, the graph 500 provides a visualization for the known IRIS dataset. Sepal width is illustrated across the y axes and sepal length is illustrated across the x axes. In an embodiment, more detail for the IRIS dataset is provided in *Dua Dheeru and Efi Karra Taniskidou*, UCI machine learning repository, 2017. Two graphs 510 and 520 illustrate coefficient inconsistency between an explanation for an example, and its nearest neighbor in the dataset. Each circle denotes an example and a colormap depicts the degree of inconsistency compared to a nearest neighbor, where red implies the least inconsistency (e.g., the most consistency) and violet implies the most inconsistency (e.g., the least consistency).

In an embodiment, the graph 510 illustrates the use of LIME with the IRIS dataset, while the graph 520 illustrates the use of the improved techniques discussed above in relation to FIGS. 3-4. As illustrated, the explanations illustrated in the graph 520 are significantly more consistent than the LIME explanations illustrated in the graph 510.

Figure 5B:
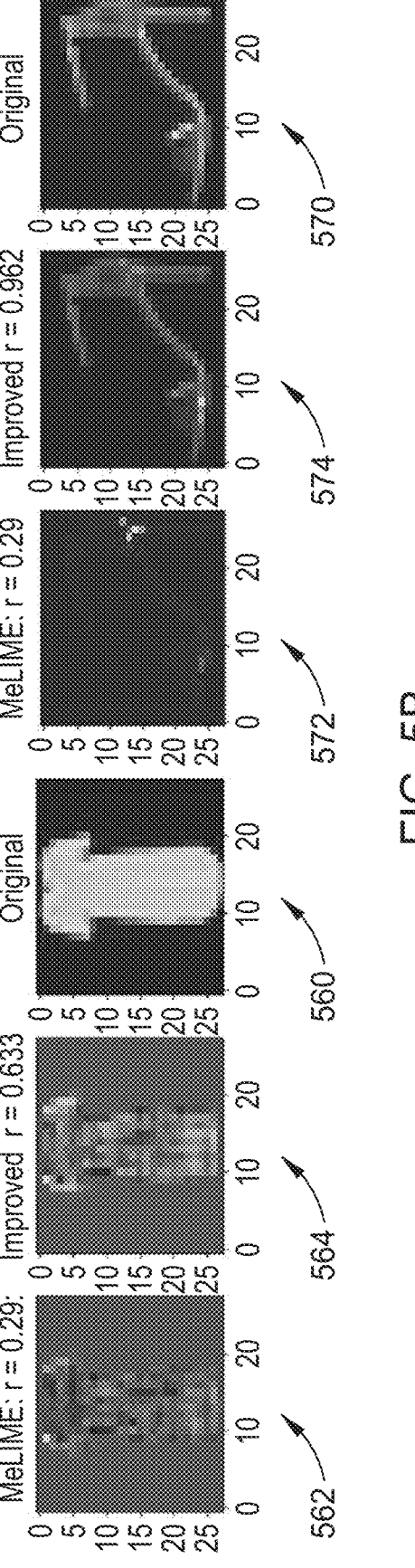
FIG. 5B further illustrates effectiveness of generating locally invariant explanations for ML, according to one embodiment.

FIG. 5B further illustrates effectiveness of generating locally invariant explanations for ML, according to one embodiment. In an embodiment, FIG. 5B illustrates use of the known FMNIST dataset, with two classes. The first images 560, 562, and 564 relate to the FMNIST class Bag while the second images 570, 572, and 574 relate to the FMNIST class Ankle boot.

The images 560 and 570 represent the mean of all images in the respective classes, taken from the FMNIST dataset. The images 562 and 572 illustrate the mean importance of all images in the class, using MeLIME. MeLIME is a version of LIME described in *Tiago Botari, Frederik Hvilshøj, Rafael Izbicki*, and Andre C. P. L. F. de Carvalho, Melime: Meaningful local explanation for machine learning models, 2020. The images 564 and 574 illustrate the mean importance of all images in the class, using the improved techniques described above in relation to FIGS. 3-4. The r values show the Pearson's correlation between average feature attribution and mean of the original images, from the respective classes. As illustrated, the improved techniques illustrated at images 564 and 574 exhibit a significantly higher correlation with the original images for the respective classes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 in FIG. 6 contains an example of an environment for the execution of at least some of the computer code involved in performing the inventive methods, such as explanation services block 650. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 650 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 650 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

While the foregoing is directed to embodiments of the present invention, other and further embodiments of the invention may be devised without departing from the basic scope thereof, and the scope thereof is determined by the claims that follow.

What is claimed is:

1. A method comprising:

identifying a machine learning (ML) model and a plurality of constraints, wherein the plurality of constraints comprises:

both: (i) a least absolute shrinkage and selection operator (LASSO) constraint and (ii) an $l_\infty$ constraint;

wherein the $l_\infty$ constraint provides a constraint for each predictor relating to only the neighborhood for which the predictor is generated, and wherein the $l_\infty$ constraint forces a matching sign relating to two generated predictors relating to two neighborhoods of the plurality of neighborhoods;

generating a plurality of neighborhoods relating to the ML model and an output from the ML model, based on the plurality of constraints;

generating a predictor for each of the plurality of neighborhoods using the ML model and the plurality of constraints, based on the output from the ML model, wherein generating the predictor comprises fitting a respective predictor to each neighborhood of the plurality of neighborhoods;

constructing a combined predictor based on combining each of the respective predictors for the plurality of neighborhoods;

creating one or more explanations relating to the ML model using the combined predictor; and reporting the one or more explanations to explain the output from the ML model.

2. The method of claim 1, wherein generating the predictor for each of the plurality of neighborhoods using the input ML model and the plurality of constraints comprises:

generating a first predictor for a first neighborhood of the plurality of neighborhoods based on the plurality of constraints; and generating a second predictor for a second neighborhood of the plurality of neighborhoods based on both an output relating to the first predictor and the plurality of constraints.

3. The method of claim 2, wherein constructing the combined predictor based on combining each of the respective predictors for the plurality of neighborhoods comprises:

summing a first output relating to the first predictor and a second output relating to the second predictor.

4. The method of claim 1, wherein the plurality of constraints comprises at least one of: (i) a least absolute shrinkage and selection operator (LASSO) constraint or (ii) an $l_\infty$ constraint.

5. The method of claim 1, further comprising:

receiving an input number of neighborhoods, wherein generating the plurality of neighborhoods comprises generating the input number of neighborhoods based on the receiving the input number of neighborhoods.

6. The method of claim 1, wherein generating the plurality of neighborhoods comprises using random perturbation to generate the plurality of neighborhoods.

7. The method of claim 1, wherein generating the plurality of neighborhoods comprises at least one of: (i) generating or (ii) selecting realistic neighborhoods.

8. The method of claim 1, wherein the ML model comprises a neural network, the output from the ML model comprises an inference by the neural network, and the one or more explanations relate to generating the inference using the neural network.

9. A system, comprising:

a processor; and a memory having instructions stored thereon which, when executed on the processor, performs operations comprising:

identifying a machine learning (ML) model, and a plurality of constraints, wherein the plurality of constraints comprises:

both: (i) a least absolute shrinkage and selection operator (LASSO) constraint and (ii) an $l_\infty$ constraint;

wherein the $l_\infty$ constraint provides a constraint for each predictor relating to only the neighborhood for which the predictor is generated, and wherein the $l_\infty$ constraint forces a matching sign relating to two generated predictors relating to two neighborhoods of the plurality of neighborhoods;

generating a plurality of neighborhoods relating to the ML model and an output from the ML model, based on the plurality of constraints;

generating a predictor for each of the plurality of neighborhoods using the ML model and the plurality of constraints, based on the output from the ML model, wherein generating the predictor comprises fitting a respective predictor to each neighborhood of the plurality of neighborhoods;

constructing a combined predictor based on combining each of the respective predictors for the plurality of neighborhoods;

creating one or more explanations relating to the ML model using the combined predictor; and reporting the one or more explanations to explain the output from the ML model.

10. The system of claim 9, wherein generating the predictor for each of the plurality of neighborhoods using the input ML model and the plurality of constraints comprises:

generating a first predictor for a first neighborhood of the plurality of neighborhoods based on the plurality of constraints; and generating a second predictor for a second neighborhood of the plurality of neighborhoods based on both an output relating to the first predictor and the plurality of constraints.

11. The system of claim 9, further comprising:

receiving an input number of neighborhoods, wherein generating the plurality of neighborhoods comprises generating the input number of neighborhoods based on the receiving the input number of neighborhoods.

12. A computer program product comprising:

a computer-readable storage medium having computer-readable program code embodied therewith, the computer-readable program code executable by one or more computer processors to perform operations comprising:

identifying a machine learning (ML) model, an output from the ML model, and a plurality of constraints, wherein the plurality of constraints comprises:

both: (i) a least absolute shrinkage and selection operator (LASSO) constraint and (ii) an $l_\infty$ constraint, wherein the $l_\infty$ constraint provides a constraint for each predictor relating to only the neighborhood for which the predictor is generated, and wherein the $l_\infty$ constraint forces a matching sign relating to two generated predictors relating to two neighborhoods of the plurality of neighborhoods;

generating a plurality of neighborhoods relating to the ML model, based on the plurality of constraints;

generating a predictor for each of the plurality of neighborhoods using the ML model and the plurality of constraints;

constructing a combined predictor based on combining each of the respective predictors for the plurality of neighborhoods; and creating one or more explanations relating to the ML model using the combined predictor.

13. The computer program product of claim 12, wherein generating the predictor for each of the plurality of neighborhoods using the input ML model and the plurality of constraints comprises:

generating a first predictor for a first neighborhood of the plurality of neighborhoods based on the plurality of constraints; and generating a second predictor for a second neighborhood of the plurality of neighborhoods based on both an output relating to the first predictor and the plurality of constraints.

14. The computer program product of claim 12, further comprising:

receiving an input number of neighborhoods, wherein generating the plurality of neighborhoods comprises generating the input number of neighborhoods based on the receiving the input number of neighborhoods.

* * * * *